United States Patent [19]

Klausz

[11] 4,387,363
[45] Jun. 7, 1983

[54] METHOD AND APPARATUS FOR OPTICAL STORAGE OF NUMERICAL IMAGES, AND PROCESSING SYSTEMS FOR SAID IMAGES

[75] Inventor: Remy Klausz, Paris, France

[73] Assignee: Compagnie Generale de Radiologie, Paris, France

[21] Appl. No.: 132,156

[22] Filed: Mar. 20, 1980

[30] Foreign Application Priority Data

Mar. 20, 1979 [FR] France ................. 79 07014

[51] Int. Cl.³ ............................................ G11C 13/00
[52] U.S. Cl. ..................................... 382/56; 365/106; 365/127
[58] Field of Search ............... 365/106, 127, 215, 216; 354/109, 120; 346/107 R; 250/568, 569, 570, 275, 320, 323; 353/25-27; 364/515, 518; 358/296, 302, 260; 340/146.3 R

[56] References Cited

U.S. PATENT DOCUMENTS 3,191,157 6/1965 Parker et al. ................. 365/127
3,479,652 11/1969 Foster ........................ 365/127
3,573,433 4/1971 Harris ......................... 365/127
3,656,120 4/1972 Maure ......................... 365/127
3,961,315 6/1976 Yokoyama .................... 365/127

Primary Examiner—Leo H. Boudreau
Attorney, Agent, or Firm—Oblon, Fisher, Spivak, McClelland & Maier

[57] ABSTRACT

The invention relates to a method of optical storage of a numerical image and to methods of analog read-out and numerical processing of an image thus stored as well as to systems which make use of said method.

All the digits of a given rank of the numbers constituting the numerical image are recorded on the same medium consisting of a film, for example, in the form of juxtaposed surface elements which, in a given example, are made conventionally opaque to light when the corresponding digit is either 1 or 0 and only in this case in order to constitute a sub-image. A surface element associated with one digit occupies a position within the sub-image which is similar to the position occupied by the number containing said digit in the numerical image.

13 Claims, 3 Drawing Figures

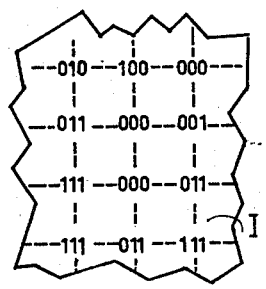 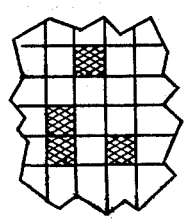 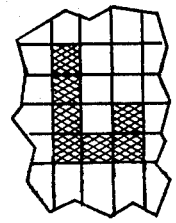 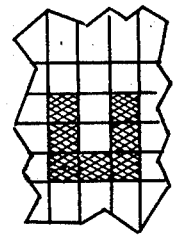
FIG. 1(a)  FIG. 1(b)  FIG. 1(c)  FIG. 1(d)
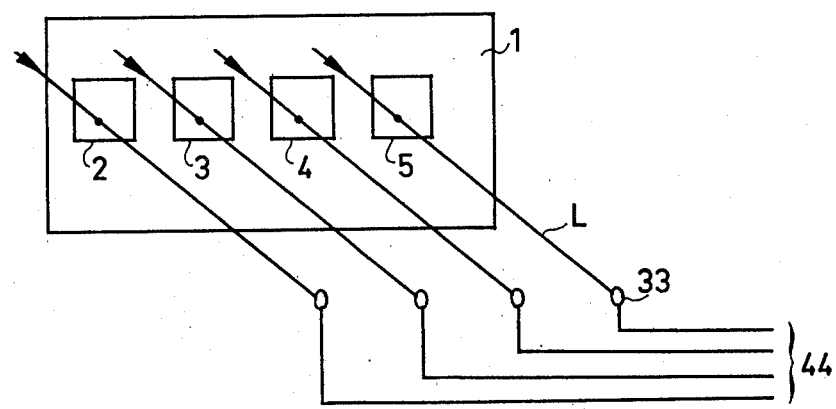
FIG. 2
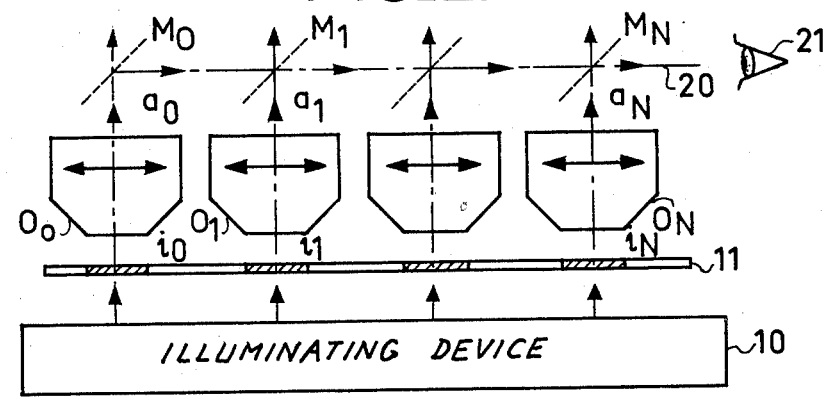
FIG. 3

METHOD AND APPARATUS FOR OPTICAL STORAGE OF NUMERICAL IMAGES, AND PROCESSING SYSTEMS FOR SAID IMAGES

The present invention is concerned with a method of optical storage of numerical images. The invention further relates to a method of analog read-out of images which have thus been stored, to a method of numerical processing of said images, and to systems which make use of these methods.

In an increasingly large number of techniques, the results appear in the form of numerical images; such results are obtained by calculation or represent variations of physical quantities measured by means of numerical sensors. Among these techniques can be mentioned spatial transmission of images, remote detection or medical diagnosis.

Furthermore, it is often advantageous to introduce an intermediate numerical stage at the time of processing or transmission of information.

In all cases, utilization of the number file constituting the numerical image necessarily involves storage of said file, either temporarily during the time required for use or permanently in order to constitute archives.

The means usually employed for this storage operation are the same as for all other files in the data processing field, namely magnetic storage on rigid media such as discs or drums or on flexible media such as magnetic tape. The information which is stored in this manner, however, can be processed only by means of devices associated with readers which are both complex and costly. Furthermore, in the case of magnetic tapes which are the least expensive of all data media at present available, the search for a particular file among others is a time-consuming and tedious operation owing to the sequential character of the recording. Finally, the ever-increasing quantity of information calls for constantly larger storage volumes.

Optical recording is another known method in current use. By means of this method, a file can be stored sequentially in the form of points which are alternately opaque (or reflecting) and transparent. These points are arranged in a circle or in a spiral on a disk and can be read by means of an opto-electronic device. The advantages of this method lie primarily in the low cost of the recording medium and the possibility of very high rates of transfer which are compatible with standard television scanning frequencies. However, it also suffers from the drawbacks of all numerical systems inasmuch as these latter entail the need for indirect processing by digital-to-analog conversion and visual display on a television receiver.

A large quantity of information can also be recorded in a small space by means of the microfilm technique. This known method offers in particular the possibility of recording data of alphabetical or numerical origin directly on microfilms by means of systems known as cathode-ray tube printers. In a system of this type, an optical device sensitizes a high-resolution photographic emulsion in predetermined shapes which reproduce the alphanumeric characters. Viewing of these documents is performed simply by means of optical magnification devices.

The aim of the present invention is to overcome the disadvantages attached to methods of storage which are at present known.

The invention is more particularly concerned with a method of optical storage of an image on a recording medium, said image being constituted by numbers each consisting of a plurality of digits and each digit being represented by a modification of an optical characteristic of the recording medium on a surface element of said medium. Said optical characteristic is capable of assuming at least as many values as the number of different digits present in the number system employed for the image. The method is mainly distinguished by the fact that the numerical image is split up into at least as many separate sub-images as the digits which it is necessary to employ in order to represent the highest possible value for a number of the numerical image, each sub-image being conventionally associated with the rank of the digit which it represents in a number of the numerical image. A further distinctive feature lies in the fact that, within each sub-image, the surface element of the recording medium associated with a predetermined digit occupies a similar position to that occupied by the number which contains said digit in the image to be recorded.

The method according to the invention is carried into practical effect by employing a technology which is closely related to the method of recording on microfilm referred-to in the foregoing. It still remains possible by means of the method aforesaid to perform analog read-out of the recorded numerical image as well as numerical processing.

The invention further relates to a method of analog read-out of the recorded numerical image which consists in obtaining a visual representation of said numerical image which is determined point by point by the combination of values of an optical quantity. Said values are obtained by modulating said quantity by means of the corresponding surface elements of at least a certain number of sub-images, the contribution of each sub-image being related to the rank of the digits which it represents.

Finally, the invention further relates to a method of numerical processing of the recorded numerical image, wherein:
 the values of the optical characteristic of the recording medium are determined in respect of at least part of the surface elements associated with numbers of the numerical image and in respect of at least a certain number of sub-images;
 one digit is associated with each determined value;
 the digits are grouped together in an order determined by the rank of the sub-images from which they are derived in order to provide numbers;
 each numbeer is processed while taking into account the position previously occupied by its digits in the different sub-images.

A more complete understanding of the invention will be gained from the following explanations, reference being made to the accompanying drawings wherein:

FIGS. 1(a), (b), (c) and (d) are explanatory diagrams of the method of storage of a numerical image according to the invention;

FIG. 2 is a schematic representation of a means for carrying out the method of numerical processing of the image according to the invention;

FIG. 3 is a schematic representation of a means for carrying out the method of analog read-out according to the invention.

The invention is essentially concerned with a novel method of optical storage of a numerical image.

Since an observable image is constituted by visually perceptible variations of a defined physical quantity at each point of a surface, it is possible to carry out a so-called sampling operation which consists in measuring the value of said physical quantity at a finite number of points which are preferably spaced at uniform intervals on the surface and to express each measurement in the form of a number. The complete set of numbers associated with the positions of the points to which they relate constitutes the numerical image and this latter contains information which can be utilized as profitably as the observable image which it represents.

Conversely, a knowledge of the values of a physical quantity which is measured or calculated at different points of a surface makes it possible to represent said quantity in the form of an observable image, thus putting the information in a form which is readily accessible to the user.

FIG. 1a shows by way of example a portion of an initial numerical image I to be stored. Said image is formed of numbers each having a plurality of digits (namely three digits in the example chosen), each number being intended to occupy a predetermined position in said image.

For this example, there has been chosen a binary number system and a square-mesh sampling lattice. The rank of a digit is defined by its position within the number. It may be decided that the digit of lowest rank is located on the far right of a number; said rank increases progressively towards the left but this is purely conventional.

In accordance with the invention, all the digits of a given rank are recorded on the same medium consisting for example of a film in the form of square surface elements in juxtaposed relation and made opaque to light when the corresponding digit is 1 and only in this case, in order to form a sub-image. A surface element associated with a digit occupies within the sub-image a position which is similar to the position occupied by the number containing said digit in the numerical image. When the different digits constituting the numbers have been recorded, there are thus obtained as many sub-images as numbers containing digits.

FIGS. 1b, 1c, 1d represent the portions of the three sub-images obtained by recording the numbers of the portion of numerical image of FIG. 1a; FIG. 1b corresponds to the digits of rank 2 (the furthest to the left in each number); FIG. 1c corresponds to the digits of rank 1 and FIG. 1d corresponds to the digits of rank O.

The different sub-images are preferably recorded on one and the same medium consisting of either a microfiche or of a tape film; this makes it possible among other things to characterize the rank of the digits of a sub-image simply by means of the position of said sub-image on the recording medium and makes it easier to process the recording.

In the example herein described, the recording operation is carried out by means of the so-called "all-or-none" technique by associating with the digit 1 a surface element of the recording medium which has been rendered opaque to light. It is clearly possible to choose the reverse convention and to associate a blackened surface element with the digit 0. Another mode of representation can also be chosen in which it is possible by way of example to associate with the digits 0 and 1 surface elements having transmission factors which are different from 1 and 0 and having intermediate values which are sufficiently distant from each other to be readily discernable.

Furthermore, the method according to the invention is not limited to the case of binary notation. However, when adopting a base notation which is higher than 2, provision must be made for a recording mode or medium which makes it possible to obtain a corresponding number of readily separable values.

Instead of transmission, it is possible to carry out recording by varying other physical characteristics of the medium such as reflectivity, refractive index, color.

Furthermore, the sampling lattice is not necessarily square but can have any configuration. Similarly, and independently of this aspect, the surface elements which are centered on the nodes of the sampling lattice can have any shape provided that they constitute a substantially juxtaposed "mosaic".

Finally, it may prove advantageous to provide a greater number of sub-images than is necessary for representing the numerical image number of highest value. These additional sub-images are reserved in this case for representation of data such as signs, a detection code or error correction.

Recording of the different sub-images is performed by known means which depend on the nature of the recording medium and of the physical characteristic to be varied. These means do not form part of the invention and will therefore not be described. The means contemplated may include those employed for photographic recording on a high-contrast emulsion or destruction of opaque thin films by a laser beam.

The method described in the foregoing permits storage of a large quantity of information in a small space. Moreover, the characteristic value of the recording medium for representing the numerical image is capable of assuming only a limited number of values and this method is consequently low in capital cost. By way of example, the method can be adopted for standard-format microfiches and to group together the sub-images of a plurality of numerical images on a single recording medium. It is possible, for example, to group together on a single standard-format microfiche ten to twenty images each consisting of ten to fifteen binary sub-images.

This method also makes it possible either to carry out analog read-out or numerical processing of the recorded image.

The invention further relates to a method of analog read-out and to a method for numerical processing of the stored image in accordance with the method described in the foregoing.

The means for carrying out these methods are within the capacity of anyone versed in the art. A device which can be adopted for each method will now be described briefly and solely in order to gain a clearer understanding of the invention.

In accordance with the invention, a visual representation of the numerical image is obtained by optical means alone without any intermediate electronic or data-processing means by combining the values of an optical quantity such as a light intensity, for example. Said values are obtained by modulating the optical quantity by means of the corresponding surface elements of at least a certain number of the recorded sub-images, the contribution of each sub-image being related to the rank of the figures which it represents in the numerical image.

To take the example of binary notation, it is known that the value g of the quantity G represented by the number $b_{N-1} \ldots b_1 b_0$ is:

$$g = 2^{(N-1)} \times b_{N-1} + \ldots + 2^1 \times b_1 + 2^0 \times B_0$$

In consequence, in order to obtain a visual representation of the image, the different sub-images need only be optically superposed (this operation consists in performing an addition to the intensities at each point), the intensity of each sub-image being such as to vary in proportion to the binary power of its rank.

FIG. 3 is a schematic illustration of means for carrying out the superposition aforementioned. A device 10 serves to ensure uniform illumination of all the subimages $i_o, i_1, \ldots, i_N$ recorded on a single medium such as a microfiche, for example. The light beams $a_0, a_1, \ldots a_n$ which are modulated by the different sub-images pass into objectives $O_0, O_1 \ldots O_n$, the object focal points of which are located in the plane of the sub-images, one objective being provided for each sub-image; the light beams are then reflected from semi-transparent mirrors $M_0, M_1, \ldots M_n$, the coefficient of reflection (or of transmission) of which is equal to 0.5. The mirrors thus ensure weighting of the light intensities transmitted by the sub-images by coefficients in geometric progression. The image transmitted by the resultant beam 20 whose intensity is the weighted sum of the light intensities transmitted by the sub-images can be observed by the user 21 either directly or by means of a photographic recording projected onto a screen or transmitted to a television camera. In the case just mentioned, the image can be displayed either directly or on a monitor after having been subjected to different processing operations. Limited image-processing operations can also be performed at the time of image reconstruction, especially in regard to contrast. To this end, it is only necessary to illuminate the sub-images by means of light beams having suitably chosen intensities of different values or to employ reflecting devices $M_0, M_1, \ldots, M_n$ having different coefficients of reflection.

FIG. 2 shows diagrammatically a means for carrying out the method of numerical processing of the recorded image. The binary sub-images 2, 3, 4, 5 obtained by means of the method of storage according to the invention and recorded on the same recording medium 1 are scanned by light beams L. The light intensities of the transmitted (or reflected) beams are measured by detectors 33 such as photoelectric cells, for example. The signals 44 emitted by said detectors can be stored in a memory device (not shown) and subsequently processed in a conventional manner. Said signals can also be utilized for direct visual display on a television screen (that is to say without intermediate storage of the entire numerical image). Scanning of the different sub-images is then performed at the video scanning frequency. Conventional image processing operations can be carried out in this case progressively as the signals appear either at the input or at the output of a digital-to-analog converter placed downstream of the detectors, or by collecting the signals corresponding to one line of the image in a buffer storage device.

Should the possibility of direct display of the image on a television screen be contemplated, it is an advantage to employ a row of detectors for each sub-image rather than a single detector in order to permit line-by-line scanning of the sub-images.

In other instances, for example when the numerical image is initially stored in a memory device, it is not necessary to make provision for one read-out beam and one detector for each sub-image. Only a single beam and a single detector need be employed, the sub-images being scanned in a totally sequential manner.

As in the method of analog read-out, it is not essential to process all the recorded sub-images or all the information contained in a sub-image.

The invention can be applied to all the technical fields in which it is necessary or advantageous to store numerical images and especially in the field of medical diagnosis. In this area of application, instruments in which images of the human body or parts of the human body under examination are produced in numerical form are coming into use in constantly increasing numbers. This is the case of tomodensitometers which serve to obtain a representation of anatomic structures by measuring transmission of ionizing radiations through said structures and in which the measured values are processed and converted to numerical images representing the distribution of absorption coefficients in one plane. This is also the case of devices employed in nuclear medicine which deliver in numerical form an image of the distribution of a radioactive substance introduced into the body as well as devices which have recently been developed for ultrasonic diagnosis and produce an image of the structures which reflect ultrasonic waves.

The numerical images supplied by these devices are subsequently displayed and/or processed. It is also necessary to store them either temporarily or in a permanent manner. The quantity of information contained in these images is very considerable. In the case of tomodensitometry, for example, each numerical image is usually formed of $256 \times 256$ numbers each containing 8 to 12 binary digits and can be increased to a maximum of $1024 \times 1024$ numbers which can each be composed of 16 digits. The method of storage in accordance with the invention is therefore particularly advantageous in this case and makes it possible to obtain an image which can be processed at low cost. The method also makes it possible to recognize the recorded images by simple observation without any need for ancillary equipment. The method finds another application in the field of conventional analog images (X-ray photographs, ultrasonic images) which can be stored by digitization in a form which is compatible with viewing with inexpensive and widely available means.

What is claimed is:

1. A method of optical storage of a numerical image on a recording medium, said image being constituted by numbers each consisting of a plurality of digits and each digit being represented by a modification of an optical characteristic of the recording medium on a surface element of said medium, said optical characteristic being capable of assuming at least as many values as the number of different digits present in the number system employed for the image, wherein the numerical image is split up into at least as many separate sub-images as the digits which it is necessary to employ in order to represent the highest possible value for a number of the numerical image, each sub-image being conventionally associated with the rank of the digit, and wherein the surface element of the recording medium associated with a predetermined digit occupies within each sub-image a similar position to that occupied by the number which contains said digit in the numerical image to be recorded wherein a certain number of sub-images is reserved for additional information such as signs, a detection code or correction of errors.

2. A method of optical storage of a numerical image on a recording medium, said image being constituted by numbers each consisting of a plurality of digits and each digit being represented by a modification of an optical characteristic of the recording medium on a surface element of said medium, said optical characteristic being capable of assuming at least as many values as the number of different digits present in the number system employed for the image, wherein the numerical image is split up into at least as many separate sub-images as the digits which it is necessary to employ in order to represent the highest possible value for a number of the numerical image, each sub-image being conventionally associated with the rank of the digit, and wherein the surface element of the recording medium associated with a predetermined digit occupies within each sub-image a similar position to that occupied by the number which contains said digit in the numerical image to be recorded wherein a visual representation of the numerical image determined point by point is obtained by combining values of an optical quantity, said values being obtained by modulation of said quantity by means of the corresponding surface elements of at least a certain number of sub-images, the contribution of each sub-image being related to the rank of the digits which it represents.

3. A method according to claim 2, wherein the optical quantity is a light intensity.

4. A method according to claim 3, wherein the light intensity at one point of the visual representation is the weighted sum of the light intensities transmitted at each point by each sub-image.

5. A method according to claim 4, wherein weighting of light intensities is carried out by means of coefficients in geometrical progression corresponding to the rank of the sub-images.

6. A method according to claim 5, wherein the weighted sum of light intensities is produced by means of semi-transparent mirrors.

7. A method according to claim 1 or 2, wherein the digits are binary digits and the optical characteristic of the recording medium is capable of assuming two values in which one value corresponds to the digit 0 and the other value corresponds to the digit 1.

8. A method according to claim 1 or 2, wherein the sub-images are stored on the same recording medium.

9. A method according to claim 8, wherein the recording medium consists of a microfiche.

10. A method according to claim 8, wherein the recording medium consists of a film in tape form.

11. A method according to claim 8, wherein the position of a sub-image on the recording medium is characteristic of the rank of the digits represented by said sub-image.

12. An application to the methods according to claim 1 or 2 to processing of X-ray images or ultrasonic images.

13. A method of optical storage of a numerical image according to claim 1 or 2 including the step of numerically processing said stored image wherein:
the values of the optical characteristics of the recording medium are determined with respect to at least part of the surface elements associated with numbers of the numerical image and with respect to at least a certain number of sub-images;
one digit is associated with each determined value;
the digits are grouped together in an order determined by the rank of the sub-images from which they are derived in order to form numbers;
each number is processed while taking into account the position previously occupied by its digits in the different sub-images.

* * * * *